United States Patent
Sakamoto et al.

(10) Patent No.: US 9,365,016 B2
(45) Date of Patent: Jun. 14, 2016

(54) FLUORINE-CONTAINING (METH) ACRYLIC (CO) POLYMER AND MOLDED BODY FILMS THEREOF

(75) Inventors: Hideyuki Sakamoto, Takasago (JP); Keisuke Hatano, Settsu (JP); Kouji Morita, Settsu (JP); Yukihiro Shimamoto, Settsu (JP)

(73) Assignee: KANEKA CORPORATION, Osaka (JP)

( * ) Notice: Subject to any disclaimer, the term of this patent is extended or adjusted under 35 U.S.C. 154(b) by 898 days.

(21) Appl. No.: 13/579,671

(22) PCT Filed: Feb. 17, 2011

(86) PCT No.: PCT/JP2011/000880
§ 371 (c)(1),
(2), (4) Date: Nov. 5, 2012

(87) PCT Pub. No.: WO2011/102132
PCT Pub. Date: Aug. 25, 2011

(65) Prior Publication Data
US 2013/0052440 A1 Feb. 28, 2013

(30) Foreign Application Priority Data
Feb. 17, 2010 (JP) .................................. 2010-033015

(51) Int. Cl.
*B32B 27/08* (2006.01)
*B32B 27/30* (2006.01)
(Continued)

(52) U.S. Cl.
CPC ................. *B32B 27/28* (2013.01); *B32B 27/08* (2013.01); *B32B 27/302* (2013.01);
(Continued)

(58) Field of Classification Search
USPC .................................. 428/215, 421; 526/245
See application file for complete search history.

(56) References Cited

U.S. PATENT DOCUMENTS 4,246,374 A 1/1981 Kopchik
5,126,409 A 6/1992 Jerman et al.

FOREIGN PATENT DOCUMENTS

EP 0136439 a2 * 4/1985
JP 63-006339 B2 2/1988
(Continued)

OTHER PUBLICATIONS

Machine_english_Translation_JP_2006126768_A; Optically Anisotropic Film, and Polarizing Plate; May 18, 2006; JPO; whole document.*

(Continued)

*Primary Examiner* — Tahseen N Khan
(74) *Attorney, Agent, or Firm* — Westerman, Hattori, Daniels & Adrian, LLP

(57) ABSTRACT

Provided are a fluorine-containing (meth)acrylic (co)polymer that scarcely generates gas when subjected to molding process, and is capable of supplying a molded body excellent in external appearance and transparency; a fluorine-containing (meth)acrylic resin film thereof; and a fluororesin laminated resin film having the same properties. The (co)polymer is a fluorine-containing (meth)acrylic (co)polymer obtained by polymerizing a monomer component including 100 to 70% by weight of a fluoroalkyl(meth)acrylate monomer, and 0 to 30% by weight of a different monomer copolymerizable therewith by effect of a radical polymerization initiator having a solubility in water of 0.1% or less by weight at 25 C, and having 8 to 14 carbon atoms.

16 Claims, 2 Drawing Sheets

(51) Int. Cl.
*C08F 220/22* (2006.01)
*B32B 27/28* (2006.01)
*C08F 220/24* (2006.01)
*B32B 27/36* (2006.01)

(52) U.S. Cl.
CPC ............ *B32B 27/304* (2013.01); *B32B 27/308* (2013.01); *B32B 27/365* (2013.01); *C08F 220/22* (2013.01); *C08F 220/24* (2013.01); *B32B 2250/24* (2013.01); *B32B 2270/00* (2013.01); *Y10T 428/24967* (2015.01); *Y10T 428/3154* (2015.04)

(56) References Cited

FOREIGN PATENT DOCUMENTS

| | | | |
|---|---|---|---|
| JP | 01-029217 | B2 | 6/1989 |
| JP | 04-009647 | B2 | 2/1992 |
| JP | 06-025361 | A | 2/1994 |
| JP | 07-009484 | A | 1/1995 |
| JP | 08-323934 | A | 12/1996 |
| JP | 10-279766 | A | 10/1998 |
| JP | 11-292921 | A | 10/1999 |
| JP | 2000-266908 | A | 9/2000 |
| JP | 2000-282016 | A | 10/2000 |
| JP | 2002-327003 | A | 11/2002 |
| JP | 2003-71990 | A | 3/2003 |
| JP | 2006-126768 | A | 5/2006 |
| JP | 2006126768 | A * | 5/2006 |
| JP | 2009-206033 | A | 9/2009 |
| JP | 2000-275403 | A | 10/2015 |
| WO | 2009/151071 | A1 | 12/2009 |
| WO | WO 2009151071 | A1 * | 12/2009 |

OTHER PUBLICATIONS

Machine_English_Translation_WO_2009151071_A1; Fluororesin Film and Fluororesin-Laminated Acrylic Resin Film; Dec. 17, 2009; EPO; whole document.*
International Search Report for PCT/JP2011/000880, mailing date of Jun. 7, 2011.

* cited by examiner

FLUORINE-CONTAINING (METH) ACRYLIC (CO) POLYMER AND MOLDED BODY FILMS THEREOF

TECHNICAL FIELD

The present invention relates to a fluorine-containing (meth)acrylic (co)polymer, a molded body or fluorine-containing (meth)acrylic resin film using this polymer, a fluorine-containing (meth)acrylic resin laminated resin film using the same, and a laminated molded product having a surface on which any one of these films is laminated.

BACKGROUND ART

Acrylic resin, such as polymethyl methacrylate, is used as a component for optics, such as an optical lens, a light diffusing plate or a light conducting plate, or as an optical film in light of optical properties and the transparency thereof; is used as a cap stock for covering a surface of a matter used outdoors while good use is made of excellent weather resistance thereof; and is used as a film that may be of various types for an alternative to a decoration such as coating or plating, or for the protection of a member.

When acrylic resin is worked into a molded product as described above, there may remain, in the resin, a monomer or oligomer component; additives for resin, such as a stabilizer, or decomposition products originating from a secondary material for polymerization; and others. In this case, the resin is softened and further gas is generated. In injection molding, the gas adheres onto a molding machine or a mold therefor. In this way, dirt adheres onto the mold, and the dirt may adhere again onto a surface of the molded product to result in a poor external appearance of the molded product, or in the incorporation of an alien substance therein. Thus, in a subsequent step, this inconvenience may cause a defect. It is therefore indispensable to wash the facilities (concerned) and the mold periodically. In contour extrusion molding, the generated gas is cooled at an inlet in the calibrator (concerned), so that a precipitation is generated. The accumulated precipitation contacts the molded product surface so that external appearance defects, such as a streak are caused therein. In the molding into a film, gas generated near a die adheres onto the cast roller (concerned), so that the resultant dirt is transferred onto the film to give fatal defects against important film properties themselves, such as a decline in the transparency, and a deterioration in the external appearance. The gas-generation in the molding process makes the quality of the molded body (product) bad, and further causes a deterioration in the working environment. Thus, it is necessary to take countermeasures about which the safety of workers is considered (such as the introduction of a protecting tool, or an exhaust system).

As a method for removing a volatile component in the resin, disclosed is a method using a supercritical fluid (for example, Patent Document 1). It is also conceivable to take a method of introducing the resin into a degasifying tank of a high temperature to remove the volatile component. This method is a method in which the resin is passed, after the polymerization therefor, into the high-temperature degasifying tank. Thus, a machine other than an extruder is required, so that a bad efficiency is unavoidable. In the meantime, about a product by imidizing an acrylic resin in order to improve the heat resistance of polymethyl methacrylate, Patent Document 2 describes a method of degasifying the resin under the atmospheric pressure or in a vacuum when the resin is extruded, thereby removing amine remaining in the resin; and Patent Document 3 describes a method of degasifying the resin again, together with methanol or water, and also describes a method of extruding the resin in a high-degree vacuum under a high screw-rotation as a method for removing oligomer components. As a method for removing the volatile component, it is conceivable to increase the number of times of passing for extruding pellets for molding, or to extrude the resin at a high temperature under a high shear. This method promotes a deterioration or decomposition of the acrylic resin. About, in particular, easily decomposable or reactive copolymer resin, this method cannot be applied thereto since a fatal bad effect is produced onto the quality of a molded body therefrom. Any one of the above-mentioned methods is a method of removing any volatile component in acrylic resin forcibly after polymerization therefor, thereby reducing, about the yielded acrylic resin, the generated-gas-quantity at the time of molding the resin. The method is not a method in which at the stage of the polymerization for the acrylic resin, an aim is directed to a reduction in the generated-gas-quantity at the molding process time.

In the meantime, out of acrylic resins, polyfluoroalkyl (meth)acrylate, or a copolymer made mainly of fluoroalkyl (meth)acrylate has a low refractive index as an optical property, and is positioned as an especial acrylic polymer which has water-repellent and oil-repellent surface property, and which is excellent in radioactive ray sensitivity based on a characteristic solubility of the polymer, hygroscopicity, and dimension stability. An example of the application of such a fluoroalkyl(meth)acrylate polymer to an industrial material is application to a material constituting a light-conducting body. As a core material thereof, polystyrene or polymethyl(meth)acrylate is used, and as a sheath material thereof, a fluoroalkyl (meth)acrylate polymer is used, which is lower in refractive index than the core material. In recent years, attention has been paid to a contamination-resistant film about which notice is taken of the water-repellent and oil-repellent surface property that fluororesins have. Of the resins, polyvinylidene fluoride has been used for a melt-moldable member for vehicles that is an alternative to coating. About fluoroalkyl (meth)acrylate polymer also, investigations have been made about a matter that while good use is made of properties that the resin is an amorphous resin and is high in transparency, the polymer is utilized as a vehicle interior member for decorating plastic surfaces.

As described above, as functional material, attention has been paid to fluoroalkyl(meth)acrylate polymer since the polymer has characteristic material properties. However, as any ester of (meth)acrylic acid esterified with a fluorinated alcohol is compared with any ester thereof esterified with an alcohol wherein the same carbon atom(s) (as in the fluorinated alcohol) is/are not fluorinated, the former ester is lower in the density of double bonds, which have radical polymerizability, and has a molecular structure that is more easily radical-depolymerized. This matter means that fluoroalkyl (meth)acrylate polymer is deteriorated whenever the polymer is thermally shaped repeatedly, so that the polymer is declined in polymerization degree, and is further deteriorated in physical property by plasticizing-effect of a fluorinated acrylic monomer generated after the radical-depolymerization. As described herein, fluoroalkyl(meth)acrylate polymer is low in thermal stability, and further the material thereof, which is a fluoroalkyl(meth)acrylate monomer, is expensive; therefore, product-development thereof has been made, up to the present time, mainly about products based on painting or coating, which are not easily deteriorated by heat. Thus, fluoroalkyl(meth)acrylate polymer has not been sufficiently developed about applied products based on melt-molding process, and has not been sufficiently researched about the molding process. As a countermeasure against the heat deterioration, a method of the addition of a deterioration preventive is disclosed. However, the addition amount thereof is required to be larger (for the resin) than for ordinary acrylic resin, so that the resultant molded body may be deteriorated in transparency; or a problem is caused about the compatibility of the fluororesin that is based on water-repellent and oil-repellent property peculiar to this resin, and this problem may cause bleeding-out, resulting in a deterioration in the external appearance of the molded body. Patent Document 4 discloses an improvement of fluoroalkyl(meth)acrylate polymer in thermal stability by a method of adding a mercaptan having a mercapto group thereto. However, the matter that this resin, fluoroalkyl(meth)acrylate polymer, is low in thermal stability is still a cause of making it difficult to subject the polymer to melt-molding process, and develop the application thereof.

CITATION LIST

Patent Documents

Patent Document 1: JP-A-11-292921
Patent Document 2: U.S. Pat. No. 4,246,374
Patent Document 3: U.S. Pat. No. 5,126,409
Patent Document 4: JP-B-1-29217

DISCLOSURE OF THE INVENTION

Problems to be Solved by the Invention

The inventors have made attempts of molding fluoroalkyl (meth)acrylate polymer into a film to find out the following newly: there remain problems that 1) in the molding, gas is generated to be adhered onto the cast roll, and then the (resultant) dirt is transferred onto the film, 2) a volatile component therein is gasified, whereby voids are generated inside the film so that the voids become defects of the film, and 3) a mucus (decomposed product) causes the generation of a die line so that the film is deteriorated in external appearance; and further 4) when the volume of the gas is large, there are caused problems producing serious effects onto the quality itself, such as a problem that a pebbly appearance phenomenon (fine irregularities), the cause of which is unclear, is generated on a surface of the film so that the film tends to be declined in transparency.

In other words, it has been made evident that it is difficult that fluoroalkyl(meth)acrylate polymer is used for a film for which severe qualities are required about transparency and external appearance, for example, for a decorative film as used in the state that this polymer in a film form is laminated on a surface of a substrate to which a print or pattern is applied.

Thus, an object of the present invention is to provide a fluorine-containing (meth)acrylic (co)polymer that scarcely generates gas when subjected to molding process, and that is capable of supplying a molded body or film excellent in external appearance and transparency; a molded body or fluorine-containing (meth)acrylic resin film, using this polymer; a fluorine-containing (meth)acrylic resin laminated resin film using the same; and a laminated molded product having a surface on which any one of these films is laminated.

Means for Solving the Problems

About fluoroalkyl(meth)acrylate polymer, it is difficult that for the restraint of gas generated therefrom, a causative substance is forcibly removed in the molding process of the polymer. Thus, the inventors have repeatedly eager investigations about a matter that the following resin is designed at the stage of the polymerization therefor: a resin restrained from being fallen in quality by gas species of a monomer or oligomer component which may cause the gas-generation, or by gas species of decomposition products originating from additives for resin, a typical example of which is a stabilizer, or from secondary materials for polymerization. As a result, the inventors have found out that the cause of the gas-generation is related to decomposition products originating from a polymerization initiator. The inventors have repeatedly made further investigations about the design of a resin restrained from being fallen in quality by the gas species of the decomposition products originating from the polymerization initiator. As a result, by polymerizing the monomer(s) concerned by use of a specified polymerization initiator, the inventors have succeeded in the following: the generation of gas species of decomposition products originating from the polymerization initiator can be restrained; the pebbly appearance phenomenon of the (resultant) film is overcome; and the film can be also improved in transparency. Thus, the present invention has been achieved. According to the achievement of the present invention, it can be expected that a high-quality product, which is small in the number of defects, can be efficiently produced in an improved working environment without imposing burdens on facilities nor restriction onto the quality (of the product).

That is, the present invention provides a fluorine-containing (meth)acrylic (co)polymer (A), obtained by polymerizing a monomer component including 100 to 70% by weight of a fluoroalkyl(meth)acrylate monomer, and 0 to 30% by weight of a different monomer copolymerizable therewith by effect of a radical polymerization initiator having a solubility in water of 0.1% or less by weight at 25 C, and having 8 to 14 carbon atoms.

In the fluorine-containing (meth)acrylic (co)polymer (A) of the present invention, the radical polymerization initiator preferably has 10 to 12 carbon atoms.

The fluorine-containing (meth)acrylic (co)polymer of the present invention preferably has a melt viscosity of 300 to 4000 Pa·sec, the melt viscosity being according to JIS K7199 under the following conditions: a dice temperature of 220 C, a shearing rate of 122 $sec^{-1}$, and a capillary die diameter of 1 mm.

In the fluorine-containing (meth)acrylic (co)polymer (A) of the present invention, it is preferable to use the radical polymerization initiator which has a 10-hour half-life period temperature of 40 C to 80 C.

In the fluorine-containing (meth)acrylic (co)polymer (A) of the present invention, it is preferable to use the radical polymerization initiator which is an azonitrile compound.

The molded body or the fluorine-containing (meth)acrylic resin film of the present invention is a body or film obtained by molding the fluorine-containing (meth)acrylic (co)polymer (A) of the present invention.

A fluorine-containing (meth)acrylic resin laminated resin film of the present invention includes a first film layer obtained by molding the fluorine(meth)acrylic (co)polymer (A) according to the present invention, and a second film layer laminated over at least one surface of the first film layer and obtained by molding a thermoplastic resin other than the fluorine-containing (meth)acrylic (co)polymer (A). In the fluorine-containing (meth)acrylic resin laminated resin film of the present invention, the thermoplastic resin is preferably at least one selected from the group consisting of methacrylic resins, vinyl chloride resins, polycarbonate resins, and ABS resins, and more preferably a methacrylic resin (B).

In the fluorine-containing (meth)acrylic resin laminated resin film of the present invention, the methacrylic resin (B) preferably includes a polymer obtained by polymerizing a monomer component including 50 to 100% by weight of methyl methacrylate, and 0 to 50% by weight of a different monomer.

In the fluorine-containing (meth)acrylic resin laminated resin film of the present invention, the methacrylic resin (B) is preferably an acrylic resin composition including 5 to 100% by weight of an acrylic elastomer graft copolymer (b-1), and 0 to 95% by weight of a methacrylic polymer (b-2) [provided that the total proportion of the components (b-1) and (b-2) is 100% by weight], the acrylic elastomer graft copolymer (b-1) is a copolymer obtained by copolymerizing 95 to 15 parts by weight of a monomer mixture (b-1b) including 50 to 100% by weight of an alkyl methacrylate and 0 to 50% by weight of a copolymerizable different vinyl monomer in the presence of 5 to 85 parts by weight of an acrylic ester crosslinked elastomer in the form of at least one layer that is obtained by polymerizing a monomer mixture (b-1a) including 50 to 99.9% by weight of an alkyl acrylate, 0 to 49.9% by weight of a copolymerizable different vinyl monomer, and 0.1 to 10% by weight of a polyfunctional monomer having, per molecule thereof, two or more copolymerizable non-conjugated double bonds [provided that the total amount of the mixtures (b-1a) and (b-1b) is 100 parts by weight], and the methacrylic polymer (b-2) is a polymer obtained by copolymerizing a monomer mixture including 80 to 100% by weight of an alkyl methacrylate and 0 to 20% by weight of a copolymerizable different vinyl monomer.

In the fluorine-containing (meth)acrylic resin laminated resin film of the present invention, a content matter of the methacrylic resin (B) that is a matter soluble in methyl ethyl ketone preferably has a reduced viscosity of 0.2 to 0.8 dL/g, the viscosity being obtained by dissolving 0.1 g of the polymer into 100 mL of chloroform, and then making a measurement at 25 C.

The fluorine-containing (meth)acrylic resin laminated resin film of the present invention preferably has a total thickness of 30 to 300 m, and the first film layer preferably has a thickness of 1 to 30 m.

The fluorine-containing (meth)acrylic resin laminated resin film of the present invention preferably has a haze of 1.3 or less, the haze being a value according to JIS K6714 under the following conditions: a temperature of 23 C 2 C, a humidity of 50% 5%, and a film thickness of 125 m.

In the fluorine-containing (meth)acrylic resin laminated resin film of the present invention, it is preferable that at least one of the fluorine-containing (meth)acrylic (co)polymer (A) and the thermoplastic resin contains at least one additive selected from the group consisting of antioxidants, thermal stabilizers, ultraviolet absorbents, ultraviolet stabilizers, inorganic pigments, organic dyes, acrylic delustering agents, mica fillers, glass fillers, antibacterial agents, deodorizers, and lubricants.

A laminated molded product of the present invention includes a molded body, and the fluorine-containing (meth)acrylic resin film of the present invention laminated over a surface of the molded body or the fluorine-containing (meth)acrylic resin laminated resin film of the present invention laminated over a surface of the molded body.

Effects of the Invention

According to the fluorine-containing (meth)acrylic (co) polymer of the present invention, a fluorine-containing (meth)acrylic resin film is obtained which scarcely generates gas when the resin is subjected to molding process, has a smooth surface and excellent external appearance and transparency, and further has therein few voids; besides, a fluororesin laminated resin film and other molded bodies that each have the same properties are obtained.

PREFERRED MODE FOR CARRYING OUT THE INVENTION

Figure 1:
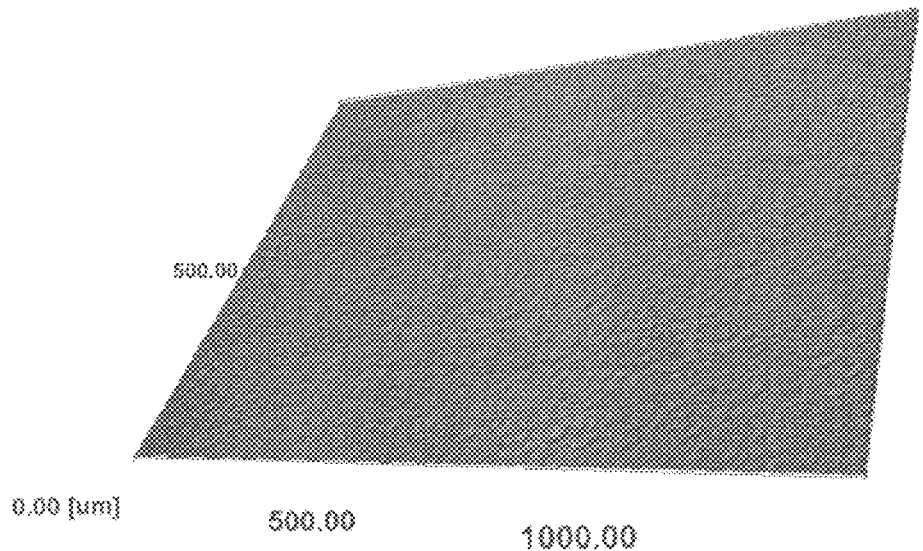
FIG. 1 is a laser microscopic photograph showing the state of surface irregularities in a fluorine-containing (meth)acrylic (co)polymer layer of a fluorine-containing (meth)acrylic resin laminated acrylic resin film in Example 2 of the present invention.

In the present invention, the fluorine-containing (meth) acrylic (co)polymer (A) is a (co)polymer obtained by polymerizing a monomer component including 100 to 70% by weight of a fluoroalkyl(meth)acrylate monomer, and 0 to 30% by weight of a different monomer copolymerizable therewith. The word "(meth)acrylic" means "acrylic and/or methacrylic", and the word "(co)polymer" denotes "a copolymer and/or a polymer". The content by percentage of the fluoroalkyl(meth)acrylate is from 70 to 100% by weight of the monomer component, the proportion of which is 100% by weight. The content by percentage is preferably 80% or more by weight, more preferably 90% or more by weight from the viewpoint of water-repellent and oil-repellent property, transparency, and others.

As for the fluoroalkyl(meth)acrylate, known one may be used. Specific examples thereof include trifluoromethyl methacrylate, trifluoromethyl acrylate, 2,2,2-trifluoroethyl methacrylate, 2,2,2-trifluoroethyl acrylate, 1,1,1,3,3,3-hexafluoro-2-propyl methacrylate, 1,1,1,3,3,3-hexafluoro-2-propyl acrylate, perfluoroethylmethyl methacrylate, perfluoropropylmethyl acrylate, perfluoropropylmethyl methacrylate, polyperfluorobutylmethyl acrylate, perfluorobutylmethyl methacrylate, perfluoropentylmethyl acrylate, perfluoropentylmethyl methacrylate, perfluorohexylmethyl acrylate, perfluorohexylmethyl methacrylate, perfluoroheptylmethyl acrylate, perfluoroheptylmethyl methacrylate, perfluorooctylmethyl acrylate, perfluorooctylmethyl methacrylate, perfluorononylmethyl acrylate, perfluorononylmethyl methacrylate, perfluorodecylmethyl acrylate, perfluorodecylmethyl methacrylate, perfluoroundecylmethyl acrylate, perfluoroundecylmethyl methacrylate, perfluorododecylmethyl acrylate, perfluorododecylmethyl methacrylate, perfluorotridecylmethyl acrylate, perfluorotridecylmethyl methacrylate, perfluorotetradecylmethyl acrylate, perfluorotetradecylmethyl methacrylate, 2-(trifluoromethyl)

ethyl acrylate, 2-(trifluoromethyl)ethyl methacrylate, 2-(perfluoroethyl)ethyl acrylate, 2-(perfluoroethyl)ethyl methacrylate, 2-(perfluoropropyl)ethyl acrylate, 2-(perfluoropropyl)ethyl methacrylate, 2-(perfluorobutyl)ethyl acrylate, 2-(perfluorobutyl)ethyl methacrylate, 2-(perfluoropentyl)ethyl acrylate, 2-(perfluoropentyl)ethyl methacrylate, 2-(perfluorohexyl)ethyl acrylate, 2-(perfluorohexyl)ethyl methacrylate, 2-(perfluoroheptyl)ethyl acrylate, 2-(perfluoroheptyl)ethyl methacrylate, 2-(perfluorooctyl)ethyl acrylate, 2-(perfluorooctyl)ethyl methacrylate, 2-(perfluorononyl)ethyl acrylate, 2-(perfluorononyl)ethyl methacrylate, perfluorotridecylethyl acrylate, 2-(perfluorotridecyl)ethyl methacrylate, 2-(perfluorotetradecyl)ethyl acrylate, and 2-(perfluorotetradecyl)ethyl methacrylate.

Examples of the different monomer copolymerizable with the fluoroalkyl(meth)acrylate, which may be referred to as the "different copolymerizable monomer" hereinafter, include methacrylic esters such as methyl methacrylate, ethyl methacrylate, propyl methacrylate, n-butyl methacrylate, isobutyl methacrylate, and t-butyl methacrylate; acrylic esters such as methyl acrylate, ethyl acrylate, propyl acrylate, n-butyl acrylate, isobutyl acrylate, t-butyl acrylate, and 2-ethylhexyl acrylate; vinyl halides such as vinyl chloride, and vinyl bromide; vinyl cyanides such as acrylonitrile, and methacrylonitrile; vinyl esters such as vinyl formate, vinyl acetate, and vinyl propionate; aromatic vinyl derivatives such as styrene, vinyltoluene, and -methylstyrene; vinylidene halides such as vinylidene chloride, and vinylidene fluoride; acrylic acid and salts thereof such as acrylic acid, sodium acrylate, and calcium acrylate; alkyl acrylate derivatives such as -hydroxyethyl acrylate, dimethylaminoethyl acrylate, glycidyl acrylate, acrylamide, and N-methylolacrylamide; methacrylic acid and salts thereof such as methacrylate acid, sodium methacrylate, and calcium methacrylate; alkyl methacrylate derivatives such as methacrylamide, -hydroxyethyl methacrylate, dimethylaminoethyl methacrylate, and glycidyl methacrylate; and acid anhydrides and imides such as maleic anhydride, methylmaleimide, and phenylmaleimide.

These may be used alone or in combination of two or more thereof.

The different copolymerizable monomer may be contained in a proportion of 0 to 30% by weight of the monomer component, the proportion of which is 100% by weight, or may not be contained. When the different monomer is contained in a proportion preferably from 0.1 to 10% by weight, more preferably from 1 to 6% by weight, the fluoroalkyl(meth)acrylic (co)polymer can keep water-repellent and oil-repellent property and a low refractive index, which are characteristics of the (co)polymer, while the (co)polymer can certainly secure transparency, moldability and, when co-extruded, bondability to a matter on which the (co)copolymer is to be laminated.

A method for producing the fluorine-containing (meth) acrylic (co)polymer (A) may be the same polymerizing method as used ordinarily except that a specified polymerization initiator is used. The method may be, for example, a known emulsion polymerization, emulsion-suspension polymerization, suspension polymerization, bulk polymerization, solution polymerization or dispersion polymerization method. It is particularly preferred from the viewpoint of a high hydrophobicity of the monomer(s) and the easiness of post-treatment to produce the (co)polymer (A) by suspension polymerization. Specifically, it is preferred to charge, into a polymerizing vessel, a monomer component which mainly contain a fluoroalkyl(meth)acrylate, a dispersion stabilizer, a dispersion stabilization aid, a radical polymerization initiator, and ion exchange water, and then polymerize the component while the reaction system is stirred to give shear necessary for preventing the components from being aggregated with each other thereto.

Examples of the dispersion stabilizer or the dispersion stabilization aid include gelatin, methylcellulose, hydroxyethylcellulose, hydroxypropylcellulose, carboxymethylcellulose, polyethylene glycol, polyethylene oxide, polyoxyethylene-polyoxypropylene block copolymer, polyacrylamide, polyacrylic acid, polyacrylic acid salts such as sodium polyacrylate, sodium aliginates such as sodium alginate, water-soluble polymers such as polyvinyl alcohol or partially saponified polyvinyl alcohol, and inorganic substances such as tricalcium phosphate, titanium oxide, calcium carbonate, and silicon dioxide. It is particularly preferred to use, out of these dispersion stabilizers or dispersion stabilization aids, polyvinyl alcohol, partially saponified polyvinyl alcohol, hydroxypropylcellulose, or tricalcium phosphate. These dispersion stabilizers or dispersion stabilization aids may be used alone or in combination of two or more thereof. The use amount of the dispersion stabilizer or dispersion stabilization aid is, for example, from 0.1 to 60 parts by weight, preferably from 0.1 to 30 parts by weight for 100 parts by weight of the monomer component. The amount is in particular preferably from 0.1 to 5 parts by weight since the film is made better in transparency as the amount of residues of the dispersing agent is smaller.

In the suspension polymerization, in order to stabilize the dispersion of droplets of the monomer(s), a surfactant may be further added thereto if necessary. Usable examples of the surfactant include anionic surfactants such as sodium dodecylbenzenesulfonate, sodium dialkylsulfosuccinate, and sodium lauryl sulfate; and nonionic surfactants such as polyethylene glycol nonyl phenyl ether. These surfactants may be used alone or in combination of two or more thereof. The use amount of the surfactant is, for example, from about 0.05 to 2 parts by weight for 100 parts by weight of the monomer component. If necessary, a water-phase polymerization inhibitor, for example, sodium nitrite, may be added.

In the present invention, the radical polymerization initiator is a radical polymerization initiator having such an oil solubility that the solubility in water is 0.1% or less by weight at 25 C, and having 8 to 14 carbon atoms. The use of this radical polymerization initiator makes it possible to restrain gas species of decomposition products originating from the polymerization initiator when the co(polymer) is subjected to molding process. Thus, a molded body is obtained which has excellent surface properties (in particular, an improvement against the pebbly appearance phenomenon of the film), and an excellent transparency. From the viewpoint of, in particular, the surface properties and the transparency, the initiator preferably has 10 to 12 carbon atoms, more preferably 10 carbon atoms. When a water-soluble radical polymerization initiator is used, the polymerization reaction does not easily advance; thus, in the present invention, the oil-soluble radical polymerization initiator, which has a solubility in water of 0.1% or less by weight, is used.

Usable examples of the radical polymerization initiator in the present invention include organic peroxides such as benzoyl peroxide, t-hexylperoxy pivalate, t-butylperoxy-2-ethyl hexanoate, and t-hexylperoxy-2-ethyl hexanoate; and azo compounds such as 2,2'-azobisisobutyronitrile, 2,2'-azobis(2-methylbutyronitrile), and 2,2'-azobis(2,4-dimethylvaleronitrile). In general, an azo compound has a bilaterally symmetric structure having a center of its azo moiety. Accordingly, an azo radical polymerization initiator having 8 to 14 carbon atoms has two carbon-atom-containing groups each having 4 to 7 carbon atoms.

It is preferred to use, out of these radical polymerization initiators, an initiator having a 10-hour half-life period temperature (the compound is halved in amount when stored at this temperature for 10 hours) of 40 to 80 C since the polymerization temperature is easily controlled and the initiator is easily handled. From the viewpoint of solubility and dispersibility, azonitrile compounds are more preferred.

These radical polymerization initiators may be used alone or in combination of two or more thereof. The use amount of the radical polymerization initiator may be appropriately set, and is, for example, preferably from 0.1 to 5 parts by weight, more preferably from 0.1 to 2 parts by weight for 100 parts by weight of the monomer component. When the (co)polymer is molded into a film, the amount is even more preferably from 0.1 to 1 part by weight since the film is made better in transparency as the amount of residues of the polymerization initiator is smaller.

The radical polymerization initiator is preferably dissolved in the monomer component in advance.

A method for producing polymer particles of the fluorine-containing (meth)acrylic (co)polymer by suspension polymerization is preferably a method of giving shearing force based on stirring to a mixture of the monomer component, the dispersion stabilizer, the dispersion stabilization aid, the oil-soluble radical polymerization initiator, and ion exchange water before reaction is started, thereby adjusting oil droplets of the monomer(s) into a desired size. In this case, it is preferred for the formation of fine monomer oil droplets of 30 m or less size to use a dispersing means that may be of various types, such as a homo-mixer, a homo-disperser, a homogenizer, or a line mixer. The size of the monomer oil droplets can be controlled by adjusting the shearing force through the rotation speed of the dispersing means, or some other.

The temperature of the thus prepared monomer oil droplets (polymerizable monomer dispersed liquid) is usually raised to the 10-hour half-life period temperature of the radical polymerization initiator or higher to conduct polymerization reaction, thereby yielding a polymer particle suspension. When, for example, 2,2'-azobisisobutyronitrile is used as the radical polymerization initiator, the temperature is raised to 65 C or higher to conduct radical polymerization.

The fluorine-containing (meth)acrylic (co)polymer yielded by the polymerization is taken out as powder (fine particles) from the polymerization reaction liquid by dehydrating operation and optional subsequent various post-treatment operations, such as salting out.

The average particle diameter of the resultant fine particles of the fluorine-containing (meth)acrylic (co)polymer (A) is preferably from 0.5 to 200 m, more preferably from 1 to 100 m. The average particle diameter of the fine polymer particles is a value measured by a light scattering method in the state that the particles are in a latex or slurry form by use of a particle size distribution measuring instrument, Microtrac MT3000, manufactured by Nikkiso Co., Ltd.

The form of the fine particles of the fluorine-containing (meth)acrylic (co)polymer (A) is not particularly limited, and is preferably the form of a sphere, a rotary ellipsoid, or some other.

The melt viscosity of the fluorine-containing (meth)acrylic (co)polymer (A) is preferably from 300 to 4000 Pa·sec, more preferably from 300 to 3000 Pa·sec, even more preferably from 300 to 2000 Pa·sec. If the melt viscosity of the fluorine-containing (meth)acrylic (co)polymer is less than 300 Pa·sec, a molded body obtained therefrom tends not to be evenly developed in the width direction with ease. On the other hand, if the viscosity is more than 4000 Pa·sec, the (co)polymer is not evenly developed with ease, when molded into a film, into a flow direction thereof. Moreover, the (co)polymer is not easily made into a thin film. When the (co)polymer is laminated onto a different resin layer, the interface between the laminated layer and the different resin layer becomes uneven so that poor adhesion, and poor external appearances such as a die line tend to be easily generated.

This melt viscosity (Pa·sec) is a value measured in accordance with JIS K7199, using a melt viscosity measuring instrument (CAPILOGRAPH ID, manufactured by Toyo Seiki Seisaku-Sho, Ltd.) under conditions that a dice temperature of 220 C, a shearing rate of 122 $sec^{-1}$, and a capillary die diameter of 1 mm.

A known light diffusing agent may be added to the fluorine-containing (meth)acrylic (co)polymer (A) of the present invention to give a design performance thereto. The light diffusing agent is preferably crosslinked polymer particles of fluorine-containing alkyl(meth)acrylate polymer, or crosslinked polymer particles of an acrylic resin that will be later described, in particular, an acrylic ester or a methacrylic ester from the viewpoint of the dispersibility thereof.

The following may be added to the fluorine-containing (meth)acrylic (co)polymer (A) of the present invention: an inorganic pigment or an organic dye for coloring; an antioxidant, a thermal stabilizer, an ultraviolet absorbent, or an ultraviolet stabilizer for improving the (co)polymer further in stability against heat and light; an acrylic delustering agent for giving a design performance thereto; a filler such as mica or glass; an antibacterial agent; a deodorizer; a lubricant; and others. These may be added alone or in combination of two or more.

In the fluorine-containing (meth)acrylic (co)polymer (A), an ultraviolet absorbent may be copolymerized with the monomer component. An ultraviolet absorbent represented by the following general formula (1) is preferred from the viewpoint of ultraviolet shielding performance, ultraviolet shielding performance retention, and a matter that the absorbent is not easily bled out at the molding process time.

[Chemical Formula 1]

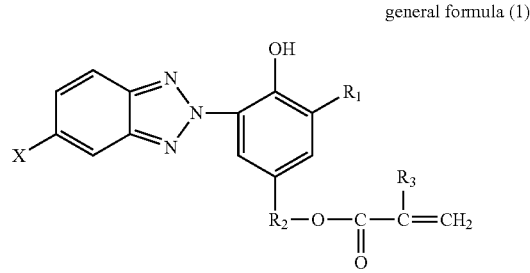

general formula (1)

In the formula, X represents H or a halogen; $R_1$ represents H, methyl or a t-alkyl group having 4 to 6; $R_2$ represents an alkylene group that is in a linear or branched chain form, and has 2 to 10 carbon atoms; and $R_3$ represents H or methyl.

As the ultraviolet absorbent represented by the general formula (1), examples that will be later given may each be used in the same manner.

The molded body or fluorine-containing (meth)acrylic resin film of the present invention is molded by use of a fluorine-containing (meth)acrylic (co)polymer (A) of the present invention. About the fluorine-containing (meth)

acrylic (co)polymer (A), one species thereof, or a combination of two or more species thereof may be used.

The molded body or fluorine-containing (meth)acrylic resin film of the present invention may be produced by an ordinary method. The method for molding the film may be a method of melt-extruding the resin into a film form through a T die or some other that is fitted to the tip of an extruder. The used extruder may be either a monoaxial extruder or a biaxial extruder. When the biaxial extruder is used, it is preferred to use a constant-quantity feeder to supply resins as raw material in order to control the extruding-out quantities thereof. From the viewpoint of resin-pressure control, and formed-film precision, it is preferred to extrude the resin through a gear pump between the extruder and the dice.

The thickness of the fluorine-containing (meth)acrylic resin film of the present invention is preferably from 30 to 300 m, more preferably from 30 to 200 m from the viewpoint of moldability and transparency.

A fluorine-containing (meth)acrylic resin laminated resin film of the present invention includes a first film layer obtained by molding the fluorine-containing (meth)acrylic (co)polymer (A), and a second film layer laminated over at least one surface of the first film layer and obtained by molding a thermoplastic resin other than the fluorine-containing (meth)acrylic (co)polymer (A). The fluorine (meth)acrylic resin laminated resin film of the present invention can attain excellent balance between water-repellent and oil-repellent property, surface performance, and transparency while the film makes good use of excellent properties of a different thermoplastic resin. The different thermoplastic resin is not particularly limited, and examples thereof include any methacrylic resin, vinyl chloride resin, polycarbonate resin, and ABS resin. Any methacrylic resin (B) is particularly preferred.

As for the methacrylic resin (B), a known methacrylic resin may be used.

From the viewpoint of hardness and moldability, the methacrylic resin (B) preferably includes a polymer yielded by polymerizing a monomer component including 50 to 100% by weight of methyl methacrylate and 0 to 50% by weight of a different monomer. As the different monomer, the abovementioned copolymerizable different vinyl monomers can each be preferably used in the same manner.

The methacrylic resin (B) is preferably a resin composition including an acrylic elastomer graft copolymer (b-1) since the resin is excellent in bending break resistance, and bending whitening resistance. The methacrylic resin (B) is more preferably a resin composition containing a methacrylic polymer (b-2) besides the acrylic elastomer graft copolymer (b-1) since the resin is excellent in surface hardness.

The methacrylic resin (B) may be a matter obtained by mixing the acrylic elastomer graft copolymer (b-1) and the methacrylic polymer (b-2), which are each yielded by polymerization, with each other into the form of a latex, a powder, beads, pellets, or some other.

The methacrylic resin (B) may be a matter obtained by producing the acrylic elastomer graft copolymer (b-1) and subsequently producing the methacrylic polymer (b-2) in the same reactor.

The acrylic elastomer graft copolymer (b-1) is preferably a copolymer obtained by copolymerizing a monomer mixture (b-1b) including 50 to 100% by weight of a methacrylic ester and 0 to 50% by weight of a copolymerizable different vinyl monomer in the presence of an acrylate crosslinked elastomer [crosslinked elastomer made mainly of an acrylic ester].

The acrylate crosslinked elastomer is preferably an elastomer obtained by polymerizing a monomer mixture (b-1a) including an acrylic ester, an optional copolymerizable different vinyl monomer, and a polyfunctional monomer having, per molecule thereof, two or more copolymerizable non-conjugated double bonds. All of the monomers and the polyfunctional monomer may be mixed with each other (one-stage polymerization), or while the composition of a raw material composed of the monomers and the polyfunctional monomer is changed, the raw material may be used in the state of being separated into two or more fragments (two- or more-stage polymerization).

The acrylic ester in the acrylate crosslinked elastomer is preferably an alkyl acrylate from the viewpoint of polymerizability, and costs. The alkyl acrylate may be an alkyl acrylate having 1 to 12 carbon atoms. Specific examples of the preferred monomer include methyl acrylate, ethyl acrylate, propyl acrylate, butyl acrylate, 2-ethylhexyl acrylate, and n-octyl acrylate. These may be used alone or in combination of two or more.

The proportion of the acrylic ester in the acrylate crosslinked elastomer is preferably from 50 to 99.9% by weight, more preferably from 70 to 99.9% by weight, most preferably from 80 to 99.9% by weight. If the proportion of the acrylic ester is less than 50% by weight, the film is declined in impact resistance. Furthermore, the resin (B) is declined in elongation when pulled to be broken, so that the film tends to be easily cracked when cut. If the proportion of the acrylic ester is 100% by weight, no copolymerization is attained so that a hard graft layer tends not to be easily formed.

Examples of the copolymerizable different vinyl monomer in the acrylate crosslinked elastomer include alkyl methacrylates such as methyl methacrylate, ethyl methacrylate, propyl methacrylate, n-butyl methacrylate, isobutyl methacrylate, and t-butyl methacrylate (the alkyl group preferably has 1 to 12 carbon atoms, and may be in a linear or branched form); vinyl halides such as vinyl chloride, and vinyl bromide; vinyl cyanides such as acrylonitrile, and methacrylonitrile; vinyl esters such as vinyl formate, vinyl acetate, and vinyl propionate; aromatic vinyl derivatives such as styrene, vinyltoluene, and -methylstyrene; vinylidene halides such as vinylidene chloride, and vinylidene fluoride; acrylic acid and salts thereof such as acrylic acid, sodium acrylate, and calcium acrylate; alkyl acrylate derivatives such as -hydroxyethyl acrylate, dimethylaminoethyl acrylate, glycidyl acrylate, acrylamide, and N-methylolacrylamide; methacrylic acid and salts thereof such as methacrylate acid, sodium methacrylate, and calcium methacrylate; alkyl methacrylate derivatives such as methacrylamide, -hydroxyethyl methacrylate, dimethylaminoethyl methacrylate, and glycidyl methacrylate; and acid anhydride derivatives such as maleic anhydride, N-alkylmaleimide, and phenylmaleimide. These may be used alone or in combination of two or more thereof. Of these examples, methacrylic esters are preferred from the viewpoint of weather resistance and transparency.

The proportion of the copolymerizable different vinyl monomer in the acrylate crosslinked elastomer is preferably from 0 to 49.9% by weight, more preferably from 0 to 30% by weight, most preferably from 0 to 20% by weight. If the proportion of the different vinyl monomer is more than 49.9% by weight, the resin (B) is declined in impact resistance, and is also declined in elongation when pulled to be broken, so that the film tends to be easily cracked when cut. The total proportion of the acrylic ester and the different vinyl monomer in the acrylate crosslinked elastomer satisfies 100% by weight.

In the acrylate crosslinked elastomer, the polyfunctional monomer having, per molecule thereof, two or more copolymerizable non-conjugated double bonds may be ordinarily used one. Examples thereof include allyl methacrylate, allyl acrylate, triallyl cyanurate, triallyl isocyanurate, diallyl phthalate, diallyl maleate, divinyl adipate, divinylbenzene, ethylene glycol dimethacrylate, diethylene glycol methacrylate, triethylene glycol dimethacrylate, trimethylolpropane trimethacrylate, tetramethylolmethane tetramethacrylate, dipropylene glycol dimethacrylate, and acrylates of these compounds. These polyfunctional monomers may be used alone or in combination of two or more thereof.

In the acrylate crosslinked elastomer, the proportion of the polyfunctional monomer having, per molecule thereof, two or more copolymerizable non-conjugated double bonds produces a large effect onto the average particle diameter of the acrylate crosslinked elastomer, and onto the stress whitening, and the elongation when the resin is pulled to be broken, or the transparency.

The blend proportion of the polyfunctional monomer in the acrylate crosslinked elastomer is preferably from 0.1 to 10% by weight, more preferably from 1.0 to 4% by weight of the total of the acrylic ester and the different vinyl monomer, the total proportion of which is 100% by weight. When the blend proportion of the polyfunctional monomer is from 0.1 to 10% by weight, the proportion is preferred from the viewpoint of the bending break resistance and the bending whitening resistance (of the resin), and the fluidity of the resin in the molding thereof. If the blend proportion of the polyfunctional monomer is more than 10% by weight, the bending resistance, the transparency of the film, and others may be declined.

The acrylic elastomer graft copolymer (b-1) is preferably a copolymer obtained by copolymerizing a monomer mixture (b-1b) including 50 to 100% by weight of a methacrylic ester and 0 to 50% by weight of a copolymerizable different vinyl monomer in the presence of the acrylate crosslinked elastomer, and is more preferably a copolymer obtained by copolymerizing 95 to 15 parts by weight of a monomer mixture (b-1b) including 50 to 100% by weight of an alkyl methacrylate and 0 to 50% by weight of a copolymerizable different vinyl monomer at least one stage in the presence of 5 to 85 parts by weight of the acrylic ester crosslinked elastomer provided that the total amount of the monomer mixtures (b-1a) and (b-1b) is 100 parts by weight.

The blend proportion of the alkyl methacrylate in the monomer mixture (b-1b) is preferably 80% or more by weight, more preferably 85% by weight, even more preferably 90% by weight from the viewpoint of the hardness and rigidity (of the resultant resin (B)). The copolymerizable different vinyl monomer may be the same as used in the above-mentioned acrylate crosslinked elastomer, or may be an alkyl acrylate wherein the alkyl group has 1 to 12 carbon atoms. Specific examples thereof include methyl acrylate, ethyl acrylate, propyl acrylate, n-butyl acrylate, isobutyl acrylate, t-butyl acrylate, 2-ethylhexyl acrylate, and n-octyl acrylate. These monomers may be used alone or in combination of two or more thereof.

At this time, in the monomer mixture (b-1b) (graft copolymerization composition), a part thereof does not graft-react with the acrylate crosslinked elastomer so that a polymer not grafted (free polymer) is generated. This component (free polymer) may be used on the premise of constituting a part or the whole of the methacrylic polymer (b-2).

Parts [the component (b-1a) and the grafted component (b-1b)] of the acrylic elastomer graft copolymer (b-1) become insoluble in methyl ethyl ketone.

The proportion of the graft to the acrylate crosslinked elastomer is preferably from 30 to 250%, more preferably from 50 to 230%, even more preferably from 70 to 220%. If the graft proportion is less than 30%, the resin (B) is declined in bending whitening resistance and transparency, and is declined in elongation when pulled to be broken, so that the film tends to be easily cracked when cut. If the graft proportion is more than 250%, the resin (B) is increased in melt viscosity in the film-molding so that the moldability into a film tends to be lowered.

The method for producing the acrylic elastomer graft copolymer (b-1) is not particularly limited, and may be a known emulsion polymerization, emulsion-suspension polymerization, suspension polymerization, bulk polymerization, solution polymerization or dispersion polymerization method. The emulsion polymerization method is particularly preferred since the flexibility of the adjustment of the resin structure is large.

The average particle diameter d of the acrylic elastomer graft copolymer (b-1) is preferably more than 100 nm and 400 nm or less, more preferably more than 100 nm and 350 nm or less, even more preferably more than 100 nm and 300 nm or less. If the average particle diameter of the acrylic elastomer graft copolymer (b-1) is 100 nm or less, the film tends to be declined in impact resistance and bending crack resistance. If the diameter is more than 400 nm, the film tends to be declined in transparency.

The average particle diameter of the acrylic elastomer graft copolymer (b-1) is a value measured by a light scattering method in the state that the particles are in a latex form by use of a particle size distribution measuring instrument, Microtrac MT3000, manufactured by Nikkiso Co., Ltd.

The average particle diameter d (nm) of the acrylate crosslinked elastomer in the methacrylic resin (B), and the quantity or proportion (w) (% by weight) of the polyfunctional monomer used in the acrylate crosslinked elastomer produce a large effect onto the stress whitening of the film, the elongation thereof when the film is pulled to be broken, or the transparency. Thus, the acrylate crosslinked elastomer preferably satisfies a relationship expression of 0.02d 0.06d, and more preferably 0.02d w 0.05d. When the proportion w of the polyfunctional monomer is in the range, the resin (B) produces advantageous effects that the resin does not easily undergo stress whitening, a decline in impact resistance, nor a decline in transparency; the resin is not easily declined in elongation when pulled to be broken, so that the film is not easily cracked when cut; and the resin is good in film moldability.

The average particle diameter d of the acrylate crosslinked elastomer in the methacrylic resin (B) is preferably from 50 to 200 nm, more preferably from 50 to 160 nm, even more preferably from 50 to 120 nm, in particular preferably from 60 to 120 nm. When the average particle diameter d of the acrylate crosslinked elastomer is 50 nm or more, the resin (B) is not easily declined in impact resistance nor elongation when pulled to be broken, so that the film is not easily cracked when cut. When the diameter d is 200 nm or less, the resin (B) does not easily undergo stress whitening so that the resin can favorably ensure transparency, in particular, transparency when molded in a vacuum (to keep transparency before and after heated).

The average particle diameter d of the acrylate crosslinked elastomer is a value on the basis of a photograph obtained by preparing a sample from the resultant film by a freeze ultrathinly sectioning method, using a transmission electron microscope (JEM1200EX, manufactured by JEOL Ltd.) to observe the sample at an accelerating voltage of 80 kV under 40000 magnifications.

The reduced viscosity of a content matter of the methacrylic resin (B) that is a matter soluble in methyl ethyl ketone is preferably from 0.2 to 0.8 dL/g, more preferably from 0.2 to 0.7 dL/g, even more preferably from 0.2 to 0.6 dL/g under conditions that 0.1 g of the polymer is dissolved in 100 mL of chloroform and a measurement is made at 25 C. When the reduced viscosity is in this range, the resultant film is not easily declined in elongation when pulled to be broken, so that the film is not easily cracked when cut. Moreover, the resin (B) has an advantage of being good in film moldability.

The reduced viscosity of the content matter soluble methyl ethyl ketone is a value obtained by dissolving the methacrylic resin (B) into methyl ethyl ketone, using a standard viscosity tube to measure the respective flow-down periods of the solution and the solvent in a thermostat of 25 C temperature according to ISO 1628-1, and then making a calculation by use of these values and the solution concentration.

The acrylic elastomer graft copolymer (b-1) is more preferably a copolymer obtained by copolymerizing an ultraviolet absorbent represented by the following general formula (1) from the viewpoint of ultraviolet shielding performance, ultraviolet shielding performance retention, and a matter that the absorbent is not easily bled out at the molding process time.

[Chemical Formula 2]

general formula (1)

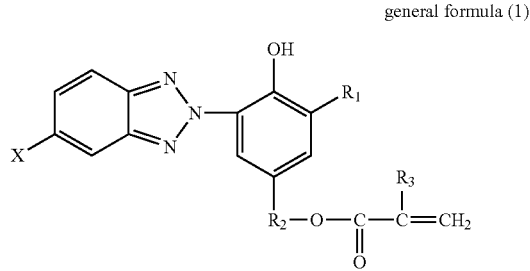

(In the formula, X represents H or a halogen; $R_1$ represents H, methyl or a t-alkyl group having 4 to 6; $R_2$ represents an alkylene group that is in a linear or branched chain form, and has 2 to 10 carbon atoms; and $R_3$ represents H or methyl.)

Examples of the ultraviolet absorbent represented by the general formula (1) include 2-(2'-hydroxy-5'-methacryloyloxyethylphenyl)-2H-benzotriazoles, such as 2-(2'-hydroxy-5'-acryloyloxyethylphenyl)-2H-benzotriazole, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, and 2-(2'-hydroxy-5'-methacryloyloxyethyl-3'-t-butylphenyl)12H-benzotriazole. Of these examples, preferred is 2-(2'-hydroxy-5'-methacryloyloxyethylphenyl)-2H-benzotriazole from the viewpoint of costs and handleability.

About the copolymerization proportion of the ultraviolet absorbent represented by the general formula (1), the amount of the absorbent is preferably from 0.01 to 30 parts by weight, more preferably from 0.01 to 25 parts by weight, even more preferably from 0.01 to 20 parts by weight, in particular preferably from 0.05 to 20 parts by weight for 100 parts by weight of the acrylic elastomer graft copolymer (b-1). If the amount is less than 0.01 part by weight about the copolymerization proportion of the ultraviolet absorbent, an effect of improving the resultant film in weather resistance tends not to be easily produced. If the amount is more than 30 parts by weight, an effect of improving the film in impact resistance and bending crack resistance tends not to be easily produced.

The ultraviolet absorbent represented by the general formula (1) may be copolymerized into any one layer of the acrylic elastomer graft copolymer (b-1). The ultraviolet absorbent is preferably copolymerized into the acrylate crosslinked elastomer and the methacrylate copolymer (b-1b), and is more preferably copolymerized evenly into the whole of the acrylic elastomer graft copolymer (b-1).

The method for the copolymerization of the ultraviolet absorbent represented by the general formula (1) is not particularly limited. The absorbent is preferably copolymerized while the acrylic elastomer graft copolymer (b-1) is produced.

An initiator for the polymerization into the acrylate crosslinked elastomer may be a known initiator such as an organic peroxide, an inorganic peroxide or an azo compound. Specific examples thereof include organic peroxides such as t-butyl hydroperoxide, 1,1,3,3-tetramethylbutyl hydroperoxide, succinic acid peroxide, t-butyl peroxymaleate, cumene hydroperoxide, benzoyl peroxide, sodium formaldehyde sulfoxylate, reducing sugar, and ascorbic acid; inorganic peroxides such as potassium persulfate, sodium persulfate, and ferrous salts; and azo compounds such as azobisisobutyronitrile. These may be used alone or in combination of two or more thereof. These initiators may each be used as an ordinary redox initiator wherein the initiator is combined with a reducing agent such as sodium sulfite, sodium thiosulfate, sodium formaldehyde sulfoxylate, ascorbic acid, hydroxyacetonic acid, ferrous sulfate, or a complex of ferrous sulfate and disodium ethylenediaminetetraacetate.

It is preferred from the viewpoint of the stabilization of the polymerization and the control of the particle diameter to use, out of these examples, an inorganic reducing agent such as a ferrous salt, and/or a redox initiator wherein such an initiator is combined with an organic reducing agent such as sodium formaldehyde sulfoxylate, reducing sugar, or ascorbic acid.

The organic peroxides may each be added by a known adding method such as a method of adding the peroxide, as it is, to the polymerization system, or a method of mixing the peroxide with the monomer(s) (concerned) to be added thereto, or a method of dispersing the peroxide into an aqueous solution of an emulsifier to be added to the monomer(s). From the viewpoint of the transparency (of the resultant), preferred is the method of mixing the peroxide with the monomer(s) to be added thereto, or the method of dispersing the peroxide into an aqueous solution of an emulsifier to be added to the monomer(s).

A surfactant used in the emulsion polymerization is not particularly limited, and may be an ordinary surfactant for emulsion polymerization. Examples thereof include anionic surfactants such as sodium alkylsulfonates, sodium alkylbenzenesulfonates, sodium dioctylsulfosuccinate, sodium laurylsulfonate, and aliphatic acid sodium salts; and nonionic surfactants such as alkylphenols, and reaction products each made from an aliphatic alcohol and propylene oxide or ethylene oxide. These surfactants may be used alone or in combination of two or more thereof. A cationic surfactant such as an alkylamine salt may be further added if necessary.

From the resultant acrylic elastomer graft copolymer (b-1) latex, a resin composition is isolated and collected by ordinary solidifying, washing and drying operations, or spray drying, freeze drying or some other treatment.

The methacrylic polymer (b-2) may be a methacrylate polymer, or a copolymer made from a methacrylic ester and a copolymerizable different vinyl monomer. The polymer (b-2) is preferably a polymer obtained by copolymerizing a monomer mixture including 80 to 100% by weight of a methacrylic ester and 0 to 20% by weight of a copolymerizable different vinyl monomer.

From the viewpoint of the hardness and the rigidness of the resultant film, the blend proportion of the methacrylic ester is preferably 85% or more by weight, more preferably 90% or more by weight.

The methacrylic ester is preferably an alkyl methacrylate, and is more preferably methyl methacrylate since this methacrylate is easily available.

Examples of the copolymerizable different vinyl monomer in the methacrylic polymer (b-2) include the monomers usable for the acrylic elastomer graft copolymer (b-1). These monomers may be used alone or in combination of two or more.

Polymerization into the methacrylic polymer (b-2) may be attained separately from polymerization into the acrylic elastomer graft copolymer (b-1). In this case also, the method for the polymerization is not particularly limited, and may be a known emulsion polymerization, emulsion-suspension polymerization, suspension polymerization, bulk polymerization or solution polymerization method.

The average particle diameter of the methacrylic polymer (b-2) is preferably from 100 to 500 m, more preferably from 100 to 300 m. If the average particle diameter of the methacrylic polymer (b-2) is less than 100 m, the resin (B) tends to be declined in impact resistance, bending crack resistance, and chemical resistance. If the diameter is more than 500 m, the resin (B) tends to be declined in transparency.

The average particle diameter of the methacrylic polymer (b-2) is a value measured by a light scattering method in the state that the particles are in a latex form by use of a particle size distribution measuring instrument, Microtrac MT3000, manufactured by Nikkiso Co., Ltd.

An initiator for the polymerization into the methacrylic polymer (b-2) may be a known initiator equivalent to the initiator for the polymerization into the acrylate crosslinked elastomer (b-1a). Examples thereof include organic peroxides, inorganic peroxides and azo compounds. These may be used alone or in combination of two or more thereof.

The organic peroxides may each be added by a known adding method such as a method of adding the peroxide, as it is, to the polymerization system, or a method of mixing the peroxide with the monomer(s) (concerned) to be added thereto, or a method of dispersing the peroxide into an aqueous solution of an emulsifier to be added to the monomer(s). From the viewpoint of the transparency (of the resultant), preferred is the method of mixing the peroxide with the monomer(s) to be added thereto.

A dispersing agent used in the suspension polymerization may be a dispersing agent used generally in suspension polymerization. Examples thereof include polymeric dispersing agents such as polyvinyl alcohol, polyvinyl pyrrolidone, and polyacrylamide; and poorly water-soluble inorganic salts such as calcium phosphate, hydroxyapatite, and magnesium pyrophosphate. When a poorly water-soluble inorganic salt is used, it is effective to use an anionic surfactant together, examples thereof including sodium-olefinsulfonates, and sodium dodecylbenzenesulfonate since the dispersion system is improved in dispersion stability. These dispersing agents may each be supplementarily added one or more times in the polymerization to adjust the particle diameter of the resultant resin particles.

The content by percentage of the acrylic elastomer graft copolymer (b-1) in the methacrylic resin (B) is preferably from 5 to 100% by weight, more preferably from 5 to 45% by weight, even more preferably from 10 to 30% by weight provided that the total proportion of the acrylic elastomer graft copolymer (b-1) and the methacrylic polymer (b-2) is 100% by weight. When the content by percentage of the acrylic elastomer graft copolymer (b-1) is 5% or more by weight, the resultant film tends not to be easily declined in elongation when pulled to be broken, so that the film is not easily cracked when cut, and the film tends not to undergo stress whitening easily. When the content by percentage is from 5 to 45% by weight, the resultant film tends to become good in hardness and rigidity.

A known light diffusing agent may be added to the methacrylic resin (B) to give a design performance thereto. The light diffusing agent is preferably crosslinked polymer particles of a fluorine-containing alkyl(meth)acrylate polymer, or crosslinked polymer particles of an acrylic resin that will be described later, in particular, acrylic ester or methacrylic ester from the viewpoint of dispersibility. The following may be added: an inorganic pigment or an organic dye for coloring; an antioxidant, a thermal stabilizer, an ultraviolet absorbent, or an ultraviolet stabilizer for improving the resin further in stability against heat and light; an acrylic delustering agent for giving a design performance thereto; a filler such as mica or glass; an antibacterial agent; a deodorizer; a lubricant; and others. These may be added alone or in combination of two or more.

The fluororesin laminated resin film of the present invention, wherein a film layer obtained by molding a fluorine-containing (meth)acrylic (co)polymer (A) is laminated on a film layer obtained by molding a different thermoplastic resin, may be produced by an ordinary producing method. Examples thereof include dry laminating, wet laminating, hot melt laminating, and hot press laminating methods; and an extrusion laminating method, wherein a material is laminated while the material is melt-extruded into a film form through a T die or some other, and a co-extruding method, wherein a material is melt-bonded inside a die, or is melt-bonded outside a die, using a multi-slot manner. The co-extruding method is most preferred since bonding performance is certainly kept between the film layer obtained by molding the fluorine-containing (meth)acrylic (co)polymer (A), and the film layer obtained by molding the methacrylic resin (B), and further in the production of a multilayered film the thermal history of the film is easily controlled.

The co-extruding method is preferably a co-extruding method in which the layers are bonded to each other inside a T die. Preferred examples of producing facilities used in this case include feed-block type laminating facilities, wherein an ordinary mono-layered manifold die is used as a T die, and a section in which a confluence layer is to be formed (feed block) is fitted to an inflow region of the die; multi-manifold type laminating facilities, wherein resins are passed, for individual layers inside a T dice, through respective manifolds to reach a junction, and then the joined resins are extruded out from a lip region; and stack plate facilities, about which a process for the formation of layers is similar to a multi-manifold die, and in which a plate having therein a manifold is fitted to a die to be extended over the whole of the die, a depression having therein the plate is made in the body of the die, and a plate pack having stacked unit-plates is inserted into the depression.

The extruder used in the co-extruding method may be either a monoaxial extruder or a biaxial extruder. When the biaxial extruder is used, it is preferred to use a constant-quantity feeder to supply resins as raw material in order to control the extruding-out quantities thereof. From the viewpoint of resin-pressure control, and formed-film precision, it is preferred to extrude the resins through a gear pump between the extruder and the dice.

In the co-extruding method, it is preferred in the molding of the laminated film to adjust the temperature of a cylinder of the extruder and that of a dice section located at the tip of the extruder into the range of 150 to 270 C. If the set temperature is adjusted to a temperature lower than 150 C, the resins are not melted so that the resins are not easily mixed with each other into an even state. Thus, the resins tend to be declined in moldability. If the temperature is higher than 270 C, heat is generated by shearing inside the extruder so that the resin temperature rises to a higher value than required. Thus, the decomposition of the resins is promoted so that the molded body tends to be declined in quality.

When the film is molded, both surfaces of the film are simultaneously brought into contact, if necessary, with rolls or metal belts, in particular, rolls or metal belts heated to the glass transition temperature or higher temperature. The obtained film may be a film excellent in surface property. The film may be modified in property in accordance with a purpose thereof by biaxial drawing, or some other.

The thickness of the whole of the fluorine-containing (meth)acrylic resin laminated resin film of the present invention is preferably from 30 to 300 m, more preferably from 30 to 200 m. If the thickness of the whole is less than 30 m, the moldability into the film tends to be declined, and the film tends to be easily wrinkled when wound up. If the thickness is more than 300 m, the film tends to be declined in transparency and secondary workability.

In the fluorine-containing (meth)acrylic resin laminated resin film of the present invention, the thickness of the film layer of the fluorine-containing (meth)acrylic (co)polymer (A) is preferably from 1 to 30 m, more preferably from 5 to 30 m, even more preferably from 5 to 20 m. If the thickness of the fluorine-containing (meth)acrylic (co)polymer (A) is less than m, the laminated resin film tends not to gain the property of the fluorine-containing (meth)acrylic (co)polymer sufficiently, and the moldability into the film is also liable to be declined. If the thickness is more than 30 m, costs increase disadvantageously. The transparency of the film is simultaneously lowered, and the moldability into the film is declined so that external appearances such as a die line tend to be easily generated.

The fluorine-containing (meth)acrylic resin laminated resin film of the present invention preferably has a haze of 1.3 or less according to JIS K 6714 under the following conditions: a temperature of 23 C 2 C, a humidity of 50% 5%, and a film thickness of 125 m. When the haze is in this range, the film can be made very good in design performance. The haze is more preferably 1.0 or less.

In the present invention, between the fluorine-containing (meth)acrylic (co)polymer (A) film layer and the different thermoplastic resin film layer, an adhesive suitable therefor, or an adhesive layer using a bonding resin may be laid for the lamination as far as the advantageous effects of the present invention are not damaged.

The adhesive or the bonding resin may be known one. Examples thereof include any alkyl(meth)acrylate resin or copolymers thereof; rubbers such as styrene-butadiene copolymer, polyisoprene rubber, and polyisobutylene rubber; polyvinyl ether type, silicone type, maleimide type, and cyano acrylate type resins; resins each made from a vinylidene halide such as vinylidene chloride or vinylidene fluoride; and mixtures each made of one or more of these polymers blended with a fluorine-containing (meth)acrylate resin containing a fluorine-containing alkyl(meth)acrylate polymer component, or with an alkyl(meth)acrylate resin.

From the viewpoint of weather resistance and transparency, preferred is any alkyl(meth)acrylate resin, which is a copolymer made mainly from an alkyl(meth)acrylate monomer. These may be used alone, or may be used in the form of an adhesive composition in which one or more thereof is blended with a crosslinking agent or an adhesive supplier.

The alkyl(meth)acrylate resin is an alkyl ester of acrylic acid or methacrylic acid, and is not particularly limited. Examples thereof include methyl acrylate, ethyl acrylate, isopropyl acrylate, n-butyl acrylate, isobutyl acrylate, pentyl (meth)acrylate, 2-ethylhexyl(meth)acrylate, isooctyl(meth) acrylate, isononyl(meth)acrylate, decyl(meth)acrylate, and lauryl(meth)acrylate.

The method for laying the adhesive layer may be a method equivalent to the method for molding into the fluororesin laminated resin film.

The usage of the fluorine-containing (meth)acrylic resin film and the fluorine-containing (meth)acrylic resin laminated resin film of the present invention is preferably usage for vehicles, and building materials. Specific examples thereof include usage for automatic interior members, such as an instrument panel, console box, meter cover, door lock bezel, steering wheel, power window switch base, center cluster, and dashboard; for automobile exterior members such as a weather strip, bumper, bumper guard, side mud guard, body panel, spoiler, front grill, strut mount, wheel cap, center pillar, door mirror, center ornament, side molding, door molding, window molding, window, headlamp cover, tail lamp cover, and windshield member; for a front panel, button, emblem, and surface decorating member of an AV instrument, or a furniture product; for a housing, display window, and button of a portable telephone; for furniture exterior members; for building-interior members such as a wall surface, ceiling, and floor; for building-exterior members such as a siding or some other external wall, and a fence, roof, gate and verge board; for furniture-surface-decorating members such as a window frame, door, handrail, doorsill, and lintel; for optical members such as a display that may be of various types, lens, mirror and window mirror, and goggles; and for interior or exterior members of a train, an airplane, a ship, and various vehicles other than automobiles.

When the laminated film of the present invention is laminated onto, in particular, an interior or exterior member for a vehicle among the above-mentioned articles, it is preferred that the front surface of the film-laminated member is the fluorine-containing resin film layer and further the adhesive layer between the film and the member is the methacrylic resin (B) film layer. The method for the laminating is not particularly limited. The lamination to be obtained is preferably produced by the same film-in-molding method or film insert molding method as described in JP-B-63-6339, JP-B-4-9647, JP-A-7-9484, JP-A-8-323934, or JP-A-10-279766. In other words, it is preferred to insert, between mold parts for injection molding, the film that is a film shaped by vacuum molding or some other, or a film not shaped, close the mold parts in the film-sandwiched state to be fastened to each other, and then inject a base resin thereto, thereby melting the film of the present invention onto a surface of the molded body of the injected base resin to be integrated with the body. At this time, injection conditions, such as the resin temperature and the injection pressure, are appropriately set, considering the kind of the base resin, and others.

EXAMPLES

Hereinafter, the present invention will be described in more detail by way of working examples and comparative examples. However, these are exemplificative, and never limit the subject matter of the present invention.

Hereinafter, the word "part(s)" denotes "part(s) by weight", and any numeral value with "part(s) by weight" in the formulation of each raw material in each of the examples is a value calculated out under a condition that the amount of all monomers used therein is regarded as 100 parts by weight.

Evaluations in each of the examples are according to methods described below. Determinations are made on the basis of the haze of the film obtained therein, and observation of a volatile gas with the naked eye.

Measurement of Melt Viscosity:

The melt of viscosity of any polymer is measured according to JIS K7199 under the following conditions: a dice temperature of 220 C, a shearing rate of 122 $sec^{-1}$, and a capillary die diameter of 1 mm.

Measurement of Reduced Viscosity:

The reduced viscosity of any polymer is a value obtained by dissolving 0.1 g of the polymer into 100 mL of chloroform, using a standard viscosity tube to measure the respective flow-down periods of the solution and the solvent in a thermostat of 25 C temperature according to ISO 1628-1, and then making a calculation by use of these values and the solution concentration.

Measurement of Average Particle Diameter of Acrylic Elastomer Particles:

About any acrylic elastomer particle latex obtained, the volume average particle diameter (m) is measured by a light scattering method, using an instrument, MICROTRAC UPA 150, manufactured by Leed & Northrup Instruments Co.

Evaluation of Generated Gas Amount:

When any copolymer is co-extruded, the amount of gas generated from a die is observed with the naked eye, and then evaluated in accordance with the following five ranks.

A: Gas is hardly generated.

B: It is verified that gas is slightly generated.

C: It is verified that gas is generated.

D: A large volume of gas is generated so that the cast roll (concerned) quickly gets dirty.

Evaluation of Pebbly Appearance:

About the fluorine-containing (meth)acrylic (co)polymer (A) of any laminated film yielded by the co-extrusion, a pebbly appearance (fine irregularities) of its film layer surface is observed with the naked eye, and then evaluated in accordance with the following three ranks.

A: No pebbly appearance is perceived.

B: A slight pebbly appearance can be recognized.

C: A pebbly appearance can be recognized.

Figure 2:
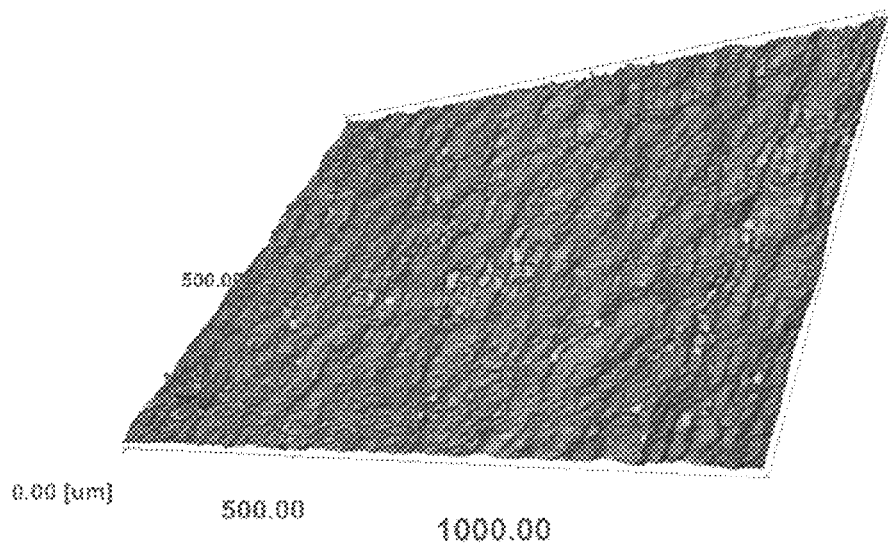
FIG. 2 is a laser microscopic photograph showing the state of surface irregularities in a fluorine-containing (meth)acrylic (co)polymer layer of a fluorine-containing (meth)acrylic resin laminated acrylic resin film in Comparative Example 1 of the present invention.
Figure 3:
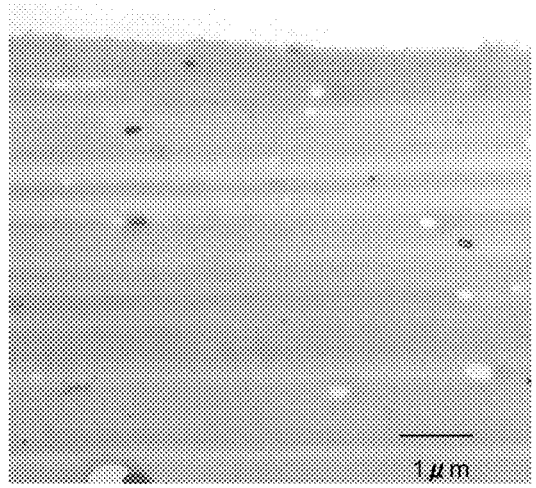
FIG. 3 is a transmission microscopic photograph obtained by photographing a cross section of the fluorine-containing (meth)acrylic (co)polymer layer of the fluorine-containing (meth)acrylic resin laminated acrylic resin film in Example 2 of the present invention.
Figure 4:
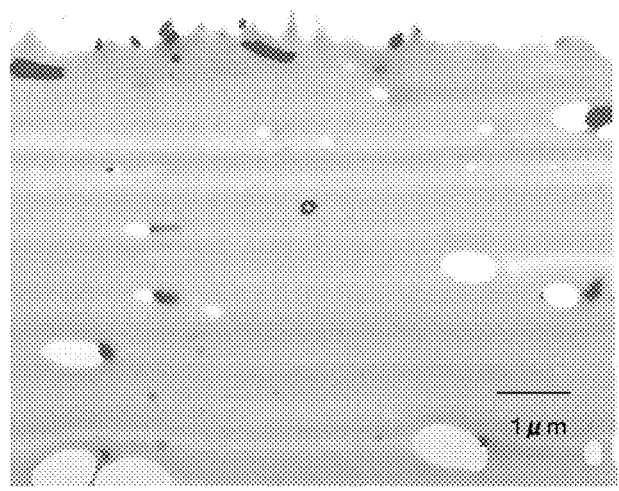
FIG. 4 is a transmission microscopic photograph obtained by photographing a cross section of the fluorine-containing (meth)acrylic (co)polymer layer of the fluorine-containing (meth)acrylic resin laminated acrylic resin film in Comparative Example 1 of the present invention.

About the fluorine-containing (meth)acrylic (co)polymer (A) of the laminated film obtained in each of Example 2 and Comparative Example 1, its film layer surface is photographed through a laser microscope, and the state of irregularities in the surface is checked. The laser-microscopic photographs that were taken about these examples are shown in FIGS. 1 and 2.

A microscope is used to measure the surface roughness (surface irregularities: Ra) of the film-layer-side surface of the fluorine-containing (meth)acrylic (co)polymer (A) of the laminated film obtained in each of Example 2 and Comparative Example 1. Ra is a value obtained by folding back the resultant roughness curve at the central line thereof, and dividing the area obtained by the roughness curve and the central line by the length measured.

Evaluation of Transparency:

<Evaluation 1>

About each of the working examples and the comparative examples, the haze is measured under the following conditions: a temperature of 23 C 2 C, and a humidity of 50% 5%.

<Evaluation 2>

A pressed plate of 3 mm thickness is produced at 200 C in 10 minutes from resin pellets of a fluorine-containing (meth)acrylic (co)polymer (A) obtained in each of production examples and comparative production examples described below. About the produced pressed plate, the haze is measured under the following conditions: a temperature of 23 C 2 C, and a humidity of 50% 5%.

Observation of Inner Voids:

The film obtained in each of Example 2 and Comparative Example 1 is cut into the thickness direction, and then a sectional area of the film layer of the fluorine-containing (meth)acrylic (co)polymer (A) is observed through a transmission electron microscope (under 10,000 magnifications), and inner voids thereof are evaluated.

Production Example 1

Fluorine-Containing (Meth)Acrylic (Co)Polymer (A-1)

Into a reaction vessel equipped with a stirrer were charged 220 parts of deionized water, 0.1 part of calcium phosphate, and 0.25 part of polyvinyl alcohol, and the inside of the reaction vessel was purged with nitrogen. Thereto was added a monomer solution composed of: 95 part of 2,2,2-trifluoroethyl methacrylate in which 0.4 part of 2,2'-azobisisobutyronitrile (the number of carbon atoms: 8; solubility into water at 25 C, 0.04% by weight; and 10-hour half-life period temperature: 65 C) was dissolved, as a polymerization initiator; and 5 parts of butyl acrylate. The rotation number of the stirrer was adjusted to set the dispersed particle diameter of the monomer to about 100 nm. Thereafter, while stirred, the reaction system was heated to raise the temperature thereof stepwise under nitrogen gas flow, thereby keeping the system at a liquid temperature of 60 C for 4 hours and a liquid temperature of 80 to 90 C for 2 hours. In this way, the polymerization was completed to produce a suspension-polymerized product having a polymer solid content concentration of 30%. The resultant polymer-particle-dispersed liquid was filtrated, and the particles were washed and dried to yield a powder of spherical organic fine particles (average particle diameter: 100 m) of poly(2,2,2-trifluoroethyl methacrylate) as a fluorine-containing (meth)acrylic (co)polymer (a-1).

A monoaxial extruder (manufactured by Osaka Seiki Kosaku) having an axis of 40 mm diameter and having a cylinder the temperature of which was adjusted to 200 C was used to melt and knead the resultant fluorine-containing (meth)acrylic (co)polymer (a-1) at a screw rotation number of 75 rpm, and an extruding-out-quantity of 10 kg/hour. The polymer was pulled out into a strand form, and then cooled in a water tank. A pelletizer was then used to cut the polymer to produce resin pellets (A-1) of the fluorine-containing (meth)acrylic (co)polymer. The resultant polymer had a melt viscosity of 540 Pa·sec.

Production Example 2

Fluorine-Containing (Meth)Acrylic (Co)Polymer (A-2)

Resin pellets (A-2) of a fluorine-containing (meth)acrylic (co)polymer were produced by the same operation as in Production Example 1 except that as a polymerization initiator for the fluorine-containing (meth)acrylic (co)polymer, use was made of 2,2'-azobis(2-methylbutyronitrile) (the number of carbon atoms: 10; solubility into water at 25 C, 0.1% or less by weight; and 10-hour half-life period temperature: 67 C). The resultant polymer had a melt viscosity of 540 Pa·sec.

Production Example 3

Fluorine-Containing (Meth)Alkyl (Co)Polymer (A-3)

Resin pellets (A-3) of a fluorine-containing (meth)alkyl (co)polymer were produced by the same operation as in Production Example 1 except that as a polymerization initiator for the fluorine-containing (meth)acrylic (co)polymer, use was made of 2,2'-azobis(2,4-dimethylvaleronitrile) (the number of carbon atoms: 14; solubility into water at 25 C, 0.01% or less by weight; and 10-hour half-life period temperature: 52 C). The resultant polymer had a melt viscosity of 540 Pa·sec.

Comparative Production Example 1

Fluorine-Containing (Meth)Alkyl (Co)Polymer (A-4)

Resin pellets (A-4) of a fluorine-containing (meth)alkyl (co)polymer were produced by the same operation as in Production Example 1 except that as a polymerization initiator for the fluorine-containing (meth)acrylic (co)polymer, use was made of 0.95 part (the mole number of which was equal to that of the polymerization initiator in Production Example 1) of lauroyl peroxide (the number of carbon atoms: 24).

Comparative Production Example 2

Fluorine-Containing (Meth)Alkyl Resin (A-5)

Resin pellets (A-5) of a fluorine-containing (meth)alkyl (co)polymer were produced by the same operation as in Production Example 1 except that as a polymerization initiator for the fluorine-containing (meth)acrylic (co)polymer, use was made of 0.3 part of lauroyl peroxide.

Production Example 4

Methacrylic Resin (B-1)

<Acrylic Elastomer Graft Copolymer (b1-1)>
The following materials were charged into an 8-L polymerizing machine equipped with a stirrer:
Deionized water: 200 parts
Sodium Dioctylsulfosuccinate: 0.25 part
Sodium formaldehyde sulfoxylate: 0.15 part
Disodium Ethylenediaminetetraacetate: 0.001 part
Ferrous sulfate: 0.00025 part
The inside of the polymerizing machine was sufficiently purged with nitrogen to be turned into a substantially oxygen-free state. The internal temperature thereof was then adjusted to 60 C, and thereto was continuously added a mixture of 30 parts of a monomer mixture (b1-1a) described below, and 0.5 part of 2-(2'-hydroxy-5'-methacryloyloxyethylphenyl)-2-H-benzotriazole (RUVA-93, manufactured by Otsuka Chemical Co., Ltd.) at a rate of 10 parts by weight per hour. After the addition, the polymerization was further continued for 0.5 hour to yield acrylate crosslinked elastomer particles (average particle diameter d=60 nm). The polymerization conversion ratio was 99.5%.
Monomer Mixture (b1-1a):
Vinyl monomer mixture (90% of butyl acrylate (BA) and 10% of methyl methacrylate (MMA)): 100 parts
Allyl methacrylate (ALMA): 1 part
Cumene hydroperoxide (CHP): 0.2 part
Thereafter, thereto was charged 0.05 part of sodium dioctylsulfosuccinate, and then the internal temperature was adjusted to 60 C. Thereto were continuously added 70 parts of a monomer mixture (b1-1b) composed of 100 parts of a vinyl monomer mixture (10 parts of BA, and 90 parts of MMA), 0.5 part of t-dodecylmercaptane (t-DM), and 0.5 part of CHP at a rate of 10 parts per hour. The polymerization was further continued for 1 hour to yield acrylic elastomer graft copolymer (b1-1) (average particle diameter d=180 μm). The polymerization conversion ratio was 98.2%. The resultant latex was subjected to salting-out with calcium chloride, and solidified, and then the solid was washed with water and dried to yield a resin powder (b1-1).
<Methacrylic Polymer (b1-2)>
As a methacrylic polymer (b1-2), use was made of a methyl methacrylate/methyl acrylate copolymer (bead-form polymer, SUMIPEX LG, manufactured by Sumitomo Chemical Co., Ltd.).
<Methacrylic Resin (B-1)>
A Henschel mixer was used to mix 70 parts of the acrylic elastomer graft copolymer (b1-1) and 30 parts of the methacrylic polymer (b1-2) each yielded as described above with each other. Thereafter, a monoaxial extruder (manufactured by Osaka Seiki Kosaku) having an axis of 40 mm diameter and having a cylinder the temperature of which was adjusted to a temperature of 200 C to 260 C was used to melt and knead the mixture at a screw rotation number of 90 rpm, and an extruding-out-quantity of 15 kg/hour. The polymer was pulled out into a strand form, and then cooled in a water tank. A pelletizer was then used to cut the polymer to produce resin pellets (B-1) of the methacrylic resin. The resultant resin had a reduced viscosity of 0.45 dL/g.
<Production 1 of a Fluorine-Containing (Meth)Acrylic Resin Laminated Acrylic Resin Film>

Example 1

By a co-extruding method described below, a laminated film having a thickness of 125 m (its base resin layer: 110 m, and its surface layer resin layer: 15 m) was yielded, using the resin pellets (B-1) of the methacrylic resin yielded in Production Example 4 as a base resin, and the resin pellets (A-1) of the fluorine-containing (meth)alkyl (co)polymer yielded in Production Example 1 as a surface layer resin.
A T die used in the co-extrusion was a 2-species-2-layer T die (of a feed block type). An extruder for the methacrylic resin (B-1) was a monoaxial extruder having a single axis of 40 mm diameter. This extruder was used to melt and knead the resin at a cylinder-set temperature of 200 to 260 C and an extruding-out quantity of 5 to 15 kg/hour. On the other hand, an extruder for the fluorine-containing (meth)acrylic (co) polymer (A-1) was a monoaxial extruder having a single axis of 32 mm diameter. This extruder was used to melt and knead the polymer at a cylinder-set temperature of 180 to 240 C and an extruding-out quantity of 0.5 to 3 kg/hour. The melted resins were put into the above-mentioned die, the dice temperature of which was set to 240 C, to yield a laminated film. Results of the evaluations of the resultant laminated film are shown in Table 1.

Example 2

By performing co-extrusion in the same way as in Example 1, a laminated film having a thickness of 125 m (its base resin layer: 110 m, and its surface layer resin layer: 15 m) was yielded, using the resin pellets (B-1) of the methacrylic resin yielded in Production Example 4 as a base resin, and the resin pellets (A-2) of the fluorine-containing (meth)alkyl (co)polymer yielded in Production Example 2 as a surface layer resin.

Results of the evaluations of the resultant laminated film are shown in Table 1.

Example 3

By performing co-extrusion in the same way as in Example 1, a laminated film having a thickness of 125 m (its base resin layer: 110 m, and its surface layer resin layer: 15 m) was yielded, using the resin pellets (B-1) of the methacrylic resin yielded in Production Example 4 as a base resin, and the resin pellets (A-3) of the fluorine-containing (meth)alkyl (co)polymer yielded in Production Example 3 as a surface layer resin.

Results of the evaluations of the resultant laminated film are shown in Table 1.

Comparative Example 1

By performing co-extrusion in the same way as in Example 1, a laminated film having a thickness of 125 m (its base resin layer: 110 m, and its surface layer resin layer: 15 m) was yielded, using the resin pellets (B-1) of the methacrylic resin yielded in Production Example 4 as a base resin, and the resin pellets (A-4) of the fluorine-containing (meth)alkyl (co)polymer yielded in Comparative Production Example 1 as a surface layer resin.

Results of the evaluations of the resultant laminated film are shown in Table 1.

Comparative Example 2

By performing co-extrusion in the same way as in Example 1, a laminated film having a thickness of 125 m (its base resin layer: 110 m, and its surface layer resin layer: 15 m) was yielded, using the resin pellets (B-1) of the acrylic resin yielded in Production Example 4 as a base resin, and the resin pellets (A-5) of the fluorine-containing (meth)alkyl (co)polymer yielded in Comparative Production Example 2 as a surface layer resin.

Results of the evaluations of the resultant laminated film are shown in Table 1.

The evaluation results of the working examples and comparative examples are described in detail hereinafter (Table 1 and FIG. 1-4). In Comparative Example 1, a large volume of gas was generated at the film-molding time, and the cast roll immediately got dirty. The dirt was transferred to the film. Even when cleaned, the cast roll immediately got dirty. Thus, a film clean at any time was not obtained. In Comparative Example 2, the volume of generated gas tended to become slightly smaller than in Comparative Example 1. However, after a little while, the cast roll got dirty. In Comparative Examples 1 and 2, a pebbly appearance (fine irregularities) was perceived. As illustrated in FIG. 2, the pebbly appearance was severe, in particular, in Comparative Example 1. On the other hand, in Example 3, at the film-molding time, the generation of gas was slightly recognized. However, in Examples 1 and 2, gas was hardly generated. In the working examples, a large improvement was made against pebbly appearance. It was also understood that in the working examples, the respective laminated films were also good in haze in the same manner as in pebbly appearance resistance (when the evaluations are compared with evaluations of the pressed plates in Table 1, it is understood that the haze-improving effect is larger in the individual laminated films than in the individual fluorine-containing (meth)acrylic resin layers themselves).

In Examples 1 and 2, no gas was generated while in Example 3, a slight gas was generated. In Comparative Examples 1 and 2, the generated gas was large in volume. Thus, it is considered that the number of carbon atoms in a polymerization initiator is related to the generation of gas. Polymerization-initiator-decomposed products (i.e., docosane, undecyl laurate, and other high-boiling-point compounds originating from the polymerization initiator in each of Comparative Examples 1 and 2) remaining in the resin were generated as gas species at the film-molding time. However, it is assumed that in Examples 1, 2 and 3, the number of carbon atoms in their polymerization initiator was small, and thus the amount of high-boiling-point decomposition products themselves was small, so that gas was hardly generated at the film-molding time.

It is considered about the pebbly appearance, and the haze deterioration that: these are intensely relevant to the generated gas since in the working examples in contrast to the comparative examples a clear improving effect thereagainst was recognized, and a remarkable difference was recognized (between the former and latter examples) in the void amount in their fluorine-containing (meth)acrylic (co)polymer layer through the observation with the transmission electron microscope; and by the restraint of the generated gas, the improvement was attained.

TABLE 1

| | Gas generation | Pebbly appearance | Surface Ra (m) | Transparency evaluation 1: haze of film | Transparency evaluation 2: haze of pressed plate | Voids |
|---|---|---|---|---|---|---|
| Example 1 | A | A | — | 1.4 | 54.96 | — |
| Example 2 | A | A (FIG. 1) | 0.7 | 0.9 | 25.15 | A small number (FIG. 3) |
| Example 3 | B | A | — | 1.2 | — | — |
| Comparative Example 1 | E | C (FIG. 2) | 2.8 | 2.9 | 24.63 | A large number (FIG. 4) |
| Comparative Example 2 | D | B | 0 | 2.6 | 26.52 | — |

It is evident from the above-mentioned matters that according to the fluorine-containing (meth)acrylic (co)polymer of the present invention which is obtained by using a particular polymerization initiator, the resultant fluorine-containing (meth)acrylic resin laminated resin film can gain film-moldability-improving effects (the restraint of gas-generation, a solution to the pebbly appearance phenomenon, and an improvement in the transparency). Thus, it is possible to provide a fluorine-containing (meth)acrylic resin film, and a fluororesin laminated resin film that are excellent in external appearance and transparency.

Production Example 5

Fluorine-Containing (Meth)Acryl (Co)Polymer (A-6)

Resin pellets (A-6) of a fluorine-containing (meth)acryl (co)polymer were produced by the same operation as in Production Example 1 except that as a polymerization initiator for the fluorine-containing (meth)acrylic (co)polymer, use was made of t-hexyl peroxypivalate (the number of carbon atoms: 11; solubility into water at 25 C, 0.1% or less by weight; and a 10-hour half-life period temperature: 53 C). The resultant polymer had a melt viscosity of 540 Pa·sec.

From the pellets, a pressed plate was produced in the same way as described above. The haze thereof was measured. As a result, the haze was 25.93.

The invention claimed is:

1. A fluorine-containing (meth)acrylic (co)polymer (A), obtained by polymerizing a monomer component comprising 100 to 70% by weight of a fluoroalkyl (meth)acrylate monomer, and 0 to 30% by weight of a different monomer copolymerizable therewith by effect of a radical polymerization initiator having a solubility in water of 0.1% or less by weight at 25° C., wherein the radical polymerization initiator is an azonitrile compound having 10 carbon atoms.

2. The fluorine-containing (meth)acrylic (co)polymer according to claim 1, which has a melt viscosity of 300 to 4000 Pa·sec, the melt viscosity being according to JIS K7199 under the following conditions: a dice temperature of 220° C., a shearing rate of 122 sec$^{-1}$, and a capillary die diameter of 1 mm.

3. The fluorine-containing (meth)acrylic (co)polymer (A) according to claim 1, wherein the radical polymerization initiator has a 10-hour half-life period temperature of 40° C. to 80° C.

4. A molded body, obtained by molding the fluorine-containing (meth)acrylic (co)polymer (A) according to claim 1.

5. A fluorine-containing (meth)acrylic resin film, obtained by molding the fluorine-containing (meth)acrylic (co)polymer (A) according to claim 1.

6. A laminated molded product, comprising:
a molded body, and
the fluorine-containing (meth)acrylic resin film according to claim 5, and laminated over a surface of the molded body.

7. A fluorine-containing (meth)acrylic resin laminated resin film, comprising:
a first film layer obtained by molding the fluorine-containing (meth)acrylic (co)polymer (A) according to claim 1, and
a second film layer laminated over at least one surface of the first film layer and obtained by molding a thermoplastic resin other than the fluorine-containing (meth)acrylic (co)polymer (A).

8. The fluorine-containing (meth)acrylic resin laminated resin film according to claim 7, wherein the thermoplastic resin is at least one selected from the group consisting of methacrylic resins, vinyl chloride resins, polycarbonate resins, and ABS resins.

9. The fluorine-containing (meth)acrylic resin laminated resin film according to claim 7, which has a total thickness of 30 to 300 μm, the first film layer having a thickness of 1 to 30 μm.

10. The fluorine-containing (meth)acrylic resin laminated resin film according to claim 7, which has a haze of 1.3 or less, the haze being a value according to JIS K6714 under the following conditions: a temperature of 23° C.±2° C., a humidity of 50%±5%, and a film thickness of 125 μm.

11. The fluorine-containing (meth)acrylic resin laminated resin film according to claim 7, wherein at least one of the fluorine-containing (meth)acrylic (co)polymer (A) and the thermoplastic resin contains at least one additive selected from the group consisting of antioxidants, thermal stabilizers, ultraviolet absorbents, ultraviolet stabilizers, inorganic pigments, organic dyes, acrylic delustering agents, mica fillers, glass fillers, antibacterial agents, deodorizers, and lubricants.

12. A laminated molded product, comprising:
a molded body, and
the fluorine-containing (meth)acrylic resin laminated resin film according to claim 8, and laminated over a surface of the molded body.

13. The fluorine-containing (meth)acrylic resin laminated resin film according to claim 7, wherein the thermoplastic resin is a methacrylic resin (B).

14. The fluorine-containing (meth)acrylic resin laminated resin film according to claim 13, wherein the methacrylic resin (B) comprises a polymer obtained by polymerizing a monomer component comprising 50 to 100% by weight of methyl methacrylate, and 0 to 50% by weight of a different monomer.

15. The fluorine-containing (meth)acrylic resin laminated resin film according to claim 13, wherein the methacrylic resin (B) is an acrylic resin composition comprising 5 to 100% by weight of an acrylic elastomer graft copolymer (b-1), and 0 to 95% by weight of a methacrylic polymer (b-2) [provided that the total proportion of the components (b-1) and (b-2) is 100% by weight],
the acrylic elastomer graft copolymer (b-1) is a copolymer obtained by copolymerizing 95 to 15 parts by weight of a monomer mixture (b-1b) comprising 50 to 100% by weight of an alkyl methacrylate and 0 to 50% by weight of a copolymerizable different vinyl monomer in the presence of 5 to 85 parts by weight of an acrylic ester crosslinked elastomer in the form of at least one layer that is obtained by polymerizing a monomer mixture (b-1a) comprising 50 to 99.9% by weight of an alkyl acrylate, 0 to 49.9% by weight of a copolymerizable different vinyl monomer, and 0.1 to 10% by weight of a polyfunctional monomer having, per molecule thereof, two or more copolymerizable non-conjugated double bonds [provided that the total amount of the mixtures (b-1a) and (b-1b) is 100 parts by weight], and
the methacrylic polymer (b-2) is a polymer obtained by copolymerizing a monomer mixture comprising 80 to 100% by weight of an alkyl methacrylate and 0 to 20% by weight of a copolymerizable different vinyl monomer.

16. The fluorine-containing (meth)acrylic resin laminated resin film according to claim 13, wherein a content matter of the methacrylic resin (B) that is a matter soluble in methyl ethyl ketone has a reduced viscosity of 0.2 to 0.8 dL/g, the viscosity being obtained by dissolving 0.1 g of the polymer into 100 mL of chloroform, and then making a measurement at 25° C.

* * * * *